Jan. 10, 1961 W. E. ALTMANN 2,967,598
SHIFTING ARRANGEMENT FOR CHANGE SPEED GEARS
Filed Sept. 16, 1957
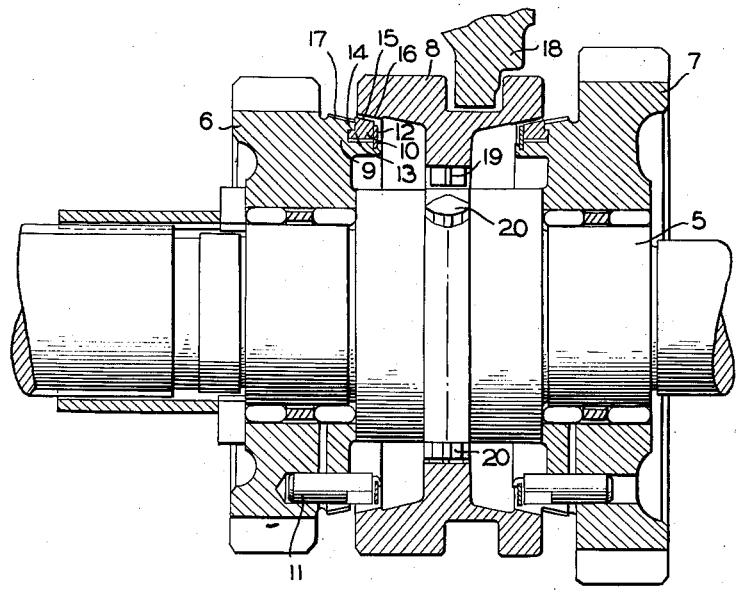
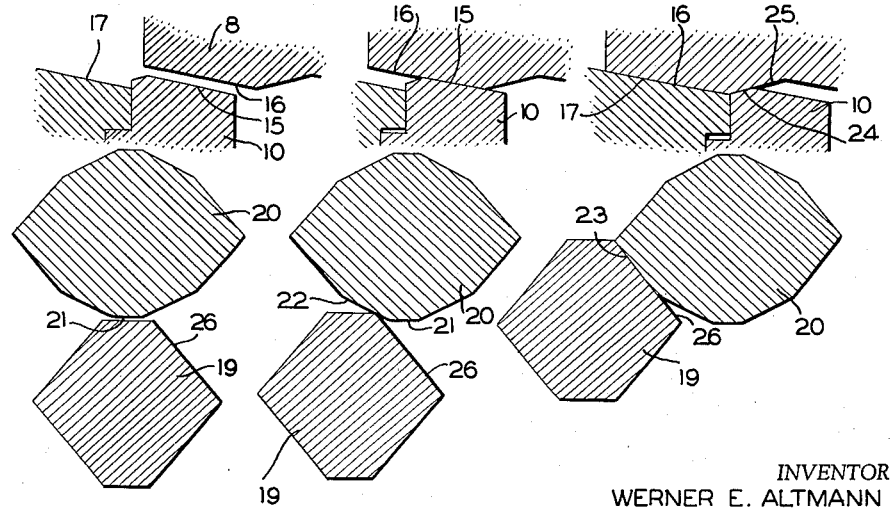
INVENTOR
WERNER E. ALTMANN
BY *Dicke and Craig*
ATTORNEYS

United States Patent Office 2,967,598
Patented Jan. 10, 1961

2,967,598

SHIFTING ARRANGEMENT FOR CHANGE SPEED GEARS

Werner E. Altmann, Stuttgart, Germany, assignor to Daimler-Benz Aktiengesellschaft, Stuttgart-Unterturkheim, Germany Filed Sept. 16, 1957, Ser. No. 684,021

Claims priority, application Germany Sept. 20, 1956

16 Claims. (Cl. 192—114)

The present invention relates to a shifting arrangement or mechanism, especially for change speed gears of motor vehicles, in which the parts movable relative to each other are initially brought into synchronism and are connected with each other subsequently thereto.

It is known in the prior art, for example, in change-speed gears or transmissions for motor vehicles, to bring the parts to be connected with each other at first to the same rotational speed during engagement of the individual speeds. After such synchronism is achieved, then the two parts thus synchronized are usually connected with each other in a form-locking manner by means of appropriate toothed devices such as claw clutches, etc.

These types of change speed gears of the prior art have the disadvantage that manufacture thereof is extremely costly by reason of the large number of toothed devices required in connection therewith.

Furthermore, during shifting, especially of the first speed, from standstill of the vehicle, the transmission may lock, and more particularly this will take place every time the toothed devices are to be disposed face to face. In practice, it has been found that the usual inclination of the teeth along the sides thereof in no way prevents with certainty such locking of the transmission so that the driver is annoyed disproportionately oftentimes by such locking action.

The present invention has as one of its objects to provide a shifting arrangement in which the aforementioned disadvantages in principle no longer can occur. The present invention thereby departs from the recognition that the basic defect during shifting of change speed transmissions, namely the noise necessarily occuring during engagement of force-locking parts with the slightest relative movement therebetween, has to be eliminated by the elimination of the cause itself.

If, on the one hand, the shifting arrangements of the prior art were subordinated to the concept of eliminating the relative movements of the force-locking parts to be connected with each other, then a shifting arrangement according to the present invention of the type mentioned hereinabove, on the other hand, is constructed in such a manner that means are arranged at both the parts to be connected with each other for achieving synchronism and means for the subsequent force-locking connection of both parts with each other.

By the use of such a construction, the present invention for the first time proposes with previously attained synchronism to eliminate altogether the subsequent force-locking engagement. From such a construction follows possibly the most important advantage residing in an extraordinary reduction of the manufacturing cost by the elimination altogether of the force-locking parts. Thus, in a transmission according to the present invention, three toothed gears may be dispensed with for each speed of the transmission.

A number of other advantages of no lesser significance will be further mentioned hereinafter by reference to the specific embodiment. It might be pointed out, however, at this time that in a shifting arrangement according to the present invention, shifting is possible in any and every position since a locking or blocking of the transmission in the force-locking sense due to the presence of the force-locking parts can no longer occur.

Exhaustive experiments and tests have indicated that the attainment of synchronism of both parts continues to have its great significance for the shifting process. For that reason, the present invention provides, simultaneously with the force-locking means, additional means to achieve synchronism, and more particularly advantageously in such a form that an elastic or springy, slotted synchronizing ring and additionally a surface for the force-locking engagement are arranged at the one part and that two complementary counter surfaces are provided at the other part.

The present invention contemplates a further improvement in the shifting arrangement by providing only one surface at the other part which cooperates with both the synchronizing ring as well as with the adjacent force-locking surface of the first part. Appropriately, all cooperating surfaces are constructed in the shape of truncated cones.

Accordingly, it is an object of the present invention to provide a shifting arrangement for change speed gears which obviates the disadvantages of the prior art devices.

It is another object of the present invention to provide a shifting arrangement for change speed gears which is very simple in construction, requires fewer parts than the prior art devices and therewith reduces the cost of manufacture.

A still further object of the present invention resides in the provision of a shifting arrangement for change speed transmissions which relies only on force-locking engagement after establishing synchronization of the parts to be connected with each other, thereby eliminating the possibility of locking of the transmission under certain operating conditions due to the presence of force-locking parts.

Another object of the present invention is the provision of a shifting arrangement including a synchronizing device for change speed transmissions which considerably reduces the noise produced during engagement of the various speeds.

These and further objects, features and advantages of the present invention will become more obvious from the following description when taken in connection with the accompanying drawing which shows, for purposes of illustration only, one embodiment in accordance with the present invention and wherein:

Figure 1 is a partial longitudinal cross-sectional view through a change speed gear for a motor vehicle in accordance with the present invention, and Figures 2 through 4 are schematic representations indicating the position corresponding to the conditions of neutral, synchronism and force-locking engagement, respectively, of the synchronizing ring and force-locking surfaces as well as of the connection between the shifting sleeve and the shaft in a shifting arrangement according to Figure 1.

Referring now to the drawing, wherein like reference numerals are used throughout the various views to designate like parts, and more particularly to Figure 1, reference numeral 5 designates a shaft of a motor vehicle change speed transmission. Two toothed gears 6 and 7 are rotatably supported on the shaft 5 by means of appropriate bearings. Each gear 6 and 7 is in continuous meshing engagement with one further gear each (not shown), both of which further gears are rigidly mounted on a counter shaft (not shown) as is conventional in such transmissions. Each pair of meshing gears, of which only gears 6 and 7 are shown for each pair, thereby forms a particular speed of the transmission.

For purposes of engaging a speed, one of the toothed gears, for example, the gear 6, has to be selectively connected with the shaft 5 for common rotation therewith. For that purpose, a shifting sleeve 8 is disposed between the two gears 6 and 7 which is axially movable with respect to the shaft 5. Before the particular desired speed can be engaged, however, both parts to be connected must be brought into synchronism.

A synchronizing ring 10 serves for that purpose which is mounted on a lateral projection 9 of the toothed gear 6 and which is supported by the pin 11 in such a manner that the ring 10 is able to rotate only a predetermined slight amount with respect to the toothed gear 6. The synchronizing ring 10 is secured against axial displacement by the disk 12. The synchronizing ring 10 may be inserted or installed with pre-tension or pre-stress, as is well known, with the projection 13 thereof underneath a complementary projection 14 provided at the toothed gear 6.

The outer surface 15 of the synchronizing ring 10 is constructed in the shape of a truncated cone. The surface 15 serves as friction surface in cooperation with a complementary countersurface in the shifting sleeve 8. Directly adjacent the synchronizing ring 10, the toothed gear 6 is provided with a further surface 17 also of truncated conical shape and having the same angle of inclination as the surface 15. The surface 17 serves for the force-locking engagement also in cooperation with a counter surface of the shifting sleeve 8. The arrangement is thereby so made that in the neutral position (Figure 2) both surfaces 15 and 17 have approximately the same average diameter.

The construction of the toothed gear 7 and its synchronizing elements is corresponding and, therefore, not described in further details. The shifting sleeve 8 can be moved axially into either direction by a shifting fork 18 and therewith may be brought selectively into effective connection with either the toothed gear 6 or the toothed gear 7. The shifting sleeve 8 is constructed in a sleeve-like manner and is provided with an inwardly disposed surface 16 of truncated conical shape which serves as counter surface for both surfaces 15 and 17 at the toothed gear 6, i.e., which, therefore, serves both for purposes of achieving synchronism as well as the subsequent force-locking engagement. It is also understood, however, that two separate surfaces may be provided in the sleeve 8 if so desired to achieve the same results. In view of the structure above described the gears 6 and 7 and the axially extending outer end portions of sleeve 8 as viewed in Figure 1 may be considered as clutch members.

The connection of the sleeve 8 with the shaft 5 takes place over contact portions comprising surfaces of elements which in the position of engagement of the synchronizing ring 10 and in the position of force-locking engagement exhibit an inclination to the axis of rotation. It is particularly appropriate if surfaces of different inclinations are associated with the two aforementioned engagement positions. The purpose of this inclination is the attainment of an axial component by the torque itself whereby the force-locking engagement is effectively aided by the drive itself.

Radial pins or abutment members 19 which extend radially inwardly are arranged in the sleeve 8 which engage alternately between pins or abutment members 20 extending radially outwardly from shaft 5. Both sets of pins 19 and 20 have abutment surfaces 21 parallel to the axis and the inclined surfaces 22, 23 and 26 as mentioned hereinabove for the automatic reinforcement of the frictional connection in both operating positions by the torque of the engine itself.

*Operation*

The operation of the shifting arrangement in accordance with the present invention becomes more clear by reference to the schematic showing in Figures 2 to 4. Figures 2 to 4 show the particular positions assumed by the radial connecting pins 19 and 20 between the sleeve 8 and the shaft 5 and the cooperating conical surfaces of synchronizing ring 10 as well as of sleeve 8 and of gear 6.

In particular, Figure 2 shows the position of the parts in "neutral," i.e., in the position in which neither of the two gears 6 or 7 is connected with the shaft 5. This position may correspond to idling position of the transmission or also may indicate that another speed (not shown) is engaged. In this position (Figure 2), the sleeve 8 is disposed exactly between the two gears 6 and 7 so that the surfaces 15, 16 and 17 of truncated conical shape do not come into contact with each other. The pins 20 at the shaft 5 take along the pins 19 at the abutment surfaces 21 which are disposed parallel to the axis and therewith impart to the sleeve 8 the rotary movement of the shaft 5 if it is assumed that the vehicle moves.

During shifting, the sleeve 8 is displaced, for example, toward the left, which means that the speed utilizing gear 6 is engaged thereby; it then becomes necessary that an effective connection between the gear 6 and the shaft 5 be obtained.

Upon displacement toward the left of the sleeve 8 by means of the shifting fork 18 at first the truncated conical surface 16 of the sleeve 8 (Figure 3) abuts against the truncated conical surface 15 of the synchronizing ring 10. At the same time, the pins 19 of the sleeve 8 have slid off the abutment surface 21 parallel to the axis and come to rest now against a surface 22 of the pins 20 which are provided with an inclination to the axis. As a result of the friction in the truncated conical surfaces 15 and 16, the synchronizing ring 10 has a tendency to expand. The synchronizing ring 10 prevents a further axial movement of the sleeve 8 toward the left as long as a difference in rotational speed exists. Only if synchronism exists between the gear 6, i.e., between the synchronizing ring 10, and the sleeve 8, will the blocking action of the synchronizing ring 10 discontinue to be effective. The synchronizing ring 10 may then be compressed against its own spring effect so that the sleeve 8 may proceed further toward the left into the position shown in Figure 4.

In this position (Figure 4), the surface 16 of the sleeve 8 now comes into abutment with the truncated conical surface 17 of the gear 6. At the same time, the pins 19 rest with the inclined surfaces 26 thereof against the inclined surface 23 of the counter pins 20 at the shaft 5. The surfaces 23 have a larger inclination than the surfaces 22. The edge 24 of the synchronizing ring is also inclined and a corresponding but deeper inclination 25 exists in the sleeve 8 adjacent the surface 16. The synchronizing ring 10 as a result of its own elasticity has returned to its original position to such an extent that both inclined portions 24 and 25 abut against each other.

As a result thereof, a force-locking engagement exists between the truncated conical surface 17 of the gear 6 and the truncated conical surface of the sleeve 8. This force-locking engagement is produced by the component of the torque due to the inclined surfaces 23 and 26. The inclined portion 24 of the synchronizing ring 10 thereby prevents sliding back of the sleeve 8 upon cessation of the torque. In this manner, it is assured that the engaged speed cannot disengage itself unintentionally.

As shown in Figures 2 and 4 only the finger-like pins 20 of the shaft 5 are provided with two inclined surfaces 22 and 23 whereas the pins 19 in the sleeve 8 only possess one inclined surface 26, and more particularly a surface 26 having a relatively large inclination. However, it is, of course, also possible to construct the pins 19 basically in the same manner as the pins 20.

The present invention enables a step-less shifting, and more particularly also during failure of the synchronizing device. Consequently, the shifting arrangement in accordance with the present invention is particularly well suited for auxiliary shifting arrangements and enables current shifting, for example, by electromagnetic means, for group-type transmissions from a suitable shifting selector. It is also possible to provide the synchronizing ring simultaneously for the force-locking engagement of both parts and to attain therewith a further simplification of the transmission.

While I shave shown and described one embodiment in accordance with the present invention, it is understood that the same is not limited thereto but is susceptible of many changes and modifications within the spirit of the present invention, and I intend to cover all such changes and modifications as encompassed by the appended claims.

I claim:

1. A shifting mechanism for change-speed transmissions of motor vehicles having two friction clutch members movable relative to each other and adapted to be brought at first into synchronism with each other and thereupon to be connected for common rotation with one another, comprising means on said two members initially establishing synchronous rotation therebetween and thereafter establishing a force-locking connection between said two members, said means including means for moving one of said members axially relative to the other of said members into a first position in which said synchronous rotation is established and into a second position in which said common rotation is established, said first-named means including a synchronizing ring carried by the other of said two members and conical force-locking surface means on each of said two members, said conical force-locking surface means on said two members being in force-locking engagement when said one of said members is in said second position, driving means for said one of said members comprising means exerting an axial pressure on said one member to hold said two members in said force-locking engagement.

2. A shifting mechanism for change-speed transmissions of motor vehicles having two clutch members movable relative to each other and thereupon to be connected for common rotation with one another comprising means for initially attaining synchronous rotation therebetween and thereafter establishing a force-locking connection between said two members, said means including means for moving one of said members axially relative to the other of said members into a first position in which said synchronous rotation is established and into a second position in which said force-locking connection is established, said first-named means including a slotted, resilient synchronizing ring carried by the said other of said members, a first surface on the said one of said members and a second surface on the said other of said members, said surfaces being included in said force-locking connection, said first surface being in engagement with said synchronizing ring when said one member is in said first position and being in engagement with said second surface when said one member is in said second position.

3. A shifting mechanism for change-speed transmissions of motor vehicles having two clutch members movable relative to each other and adapted to be brought at first into synchronism and thereupon to be connected to each other for common rotation, comprising means establishing synchronous rotation therebetween and thereafter establishing a force-locking connection between said two clutch members, said means including means for moving one of said members axially relative to the other of said members into a first position in which said synchronous rotation is established and into a second position in which said common rotation is established, said first-named means including synchronizing ring means carried by the said other of said members and complementary force-locking surface means on both said members, said force-locking surface means being comprised in said force-locking connection, said surface means including a conical surface on said one of said two members and a conical surface on the said other of said two members, said conical surfaces being curved about a common axis, said conical surface on said one of said members contacting said synchronizing ring means in said first position of said one of said members, and said conical surfaces being in mutual surface contact when said one of said members is in said second position.

4. A shifting mechanism according to claim 3, wherein said force-locking surface means on one of said members further comprises a surface inclined to said first-named conical surface, said synchronizing ring means comprising a synchronizing ring having a surface thereon of the same inclination as said inclined surface, said last-named surfaces being in mutual surface contact when said one of said members is in said second position.

5. A shifting mechanism according to claim 3, wherein said synchronizing ring means comprises a synchronizing ring, the outer surface of said synchronizing ring and said conical surface on the other of said two members having approximately the same average diameter, said synchronizing ring and said last-named conical surface being disposed adjacent each other.

6. A shifting mechanism according to claim 5 wherein the outer edge of said synchronizing ring adjacent said last-named conical surface is bevelled.

7. A shifting mechanism according to claim 3, further comprising a shaft, said means for moving one of said members comprising a shifting sleeve on said shaft, a shifting fork for actuating said shifting sleeve, said one of said members constituting an outer end portion of said shifting sleeve, said outer end portion having an inner peripheral portion constituting said conical surface on said one of said members, said surface means further including a further surface on the inner periphery of said sleeve, said further surface being inclined to and joining said last-named conical surface, said synchronizing ring means including a synchronizing ring supported by said other clutch member adjacent said conical surface on said other clutch member, the peripheral portion of said synchronizing ring nearest said last-named conical surface having a beveled surface, said further surface being in contact with said bevel surface when said one of said members is in said second position.

8. A shifting mechanism according to claim 3, further comprising a shaft, said means for moving said one of said members comprising a shiftable member on said shaft, means providing a connection between said shiftable member and said shaft comprising abutment members on said shiftable member and abutment members on said shaft, said first-named abutment members having contact portions, said second-named abutment members having contact portions, the contact portions of said first-named abutment members being in abutting engagement with the contact portions of said second-named abutment members when said one of said members is in said first position, said first-named abutment members having further contact portions, said second-named abutment members having further contact portions, said further contact portions of said first-named abutment members being in abutting engagement with the further contact portions of said second-named abutment members when said one of said members is in said second position, said contact portions and said further contact portions on each of said second-named abutment members comprising surfaces of respectively different inclinations to the axis of said shaft.

9. A shifting mechanism according to claim 8, wherein said further contact portions on said abutment members on said shaft comprise surfaces inclined to the axis of said shaft.

10. A shifting mechanism according to claim 9, wherein said abutment members are constituted by sets of alternately engaging radial pins on said shaft and said shiftable member.

11. A shifting mechanism according to claim 10, wherein said abutment members constituted by said pins are also provided with abutment surfaces essentially parallel to said axis, said last-named abutment surfaces being in mutual engagement when said two clutch members are in neutral position.

12. A shifting mechanism according to claim 8, wherein the surfaces having the relatively largest inclinations comprised in said surfaces of respectively different inclinations, constitute said further contact portions of said abutment members on said shaft.

13. A shifting mechanism according to claim 12, wherein said contact portions of said abutment members on said shaft include edge portions.

14. A shifting mechanism for change-speed gears of motor vehicles adapted to bring into synchronism two clutch members movable relative to one another and to subsequently connect said two clutch members with each other to provide common rotation therebetween, comprising means on said two clutch members to initially establish synchronism therebetween, and means on said two clutch members to connect the same in force-locking engagement only after establishment of said synchronism, one of said clutch members including a shaft, shifting means movable axially with respect to said shaft, and means imparting rotary movement from said shaft to said shifting means including means to aid said force-locking engagement by the torque applied to said shaft.

15. A shifting device for the transmission of a motor vehicle comprising a shaft, two clutch members carried by said shaft and relatively axially movable into mutual engagement, synchronizing ring means carried by one of said clutch members for causing said clutch members to rotate in synchronous relationship, first means moving the other clutch member into engagement with said synchronizing ring means, second means moving said other clutch member into engagement with said one of said two clutch members, a member fixed to said shaft, said second means comprising said last-mentioned member.

16. A shifting device according to claim 15, wherein said first means and said second means comprise a shiftable member, a part carried by said shiftable member and adapted for cooperation with said member fixed to said shaft, said first means comprising a means for shifting said shiftable element and said second means comprising a surface on said part and a cooperating surface on said member fixed to said shaft.

References Cited in the file of this patent

UNITED STATES PATENTS

| | | |
|---|---|---|
| 1,224,997 | Ballard | May 8, 1917 |
| 1,901,714 | Vincent | Mar. 14, 1933 |
| 2,070,140 | Peterson et al. | Feb. 9, 1937 |
| 2,470,208 | Avila | May 17, 1949 |
| 2,771,975 | Schmid | Nov. 27, 1956 |
| 2,791,309 | Couse | May 7, 1957 |